(12) United States Patent
Nishigaki et al.

(10) Patent No.: US 8,988,276 B2
(45) Date of Patent: Mar. 24, 2015

(54) VEHICLE SURROUNDINGS MONITORING DEVICE

(75) Inventors: Morimichi Nishigaki, Saitama (JP); Yuji Yokochi, Saitama (JP); Atsuhiro Eguchi, Saitama (JP); Masaki Negoro, Saitama (JP); Kenichi Sawada, Saitama (JP)

(73) Assignee: Honda Motor Co., Ltd., Tokyo (JP)

(*) Notice: Subject to any disclaimer, the term of this patent is extended or adjusted under 35 U.S.C. 154(b) by 330 days.

(21) Appl. No.: 13/577,125

(22) PCT Filed: Feb. 9, 2011

(86) PCT No.: PCT/JP2011/052724
§ 371 (c)(1),
(2), (4) Date: Aug. 3, 2012

(87) PCT Pub. No.: WO2011/114815
PCT Pub. Date: Sep. 22, 2011

(65) Prior Publication Data
US 2012/0293357 A1    Nov. 22, 2012

(30) Foreign Application Priority Data
Mar. 17, 2010   (JP) .................... 2010-061634

(51) Int. Cl.
*G01S 13/00*   (2006.01)
*G01S 17/93*   (2006.01)
(Continued)

(52) U.S. Cl.
CPC ............. *G01S 17/936* (2013.01); *G01S 17/023* (2013.01); *G06K 2209/23* (2013.01);
(Continued)

(58) Field of Classification Search
CPC ..... G01S 17/936; G01S 17/58; G01S 17/023; G06K 9/00791; G06K 2209/23; G08G 1/015
USPC .......................................................... 342/52
See application file for complete search history.

(56) References Cited

U.S. PATENT DOCUMENTS 7,218,385 B2    5/2007   Takagi
7,777,669 B2    8/2010   Tokoro et al.
(Continued)

FOREIGN PATENT DOCUMENTS

EP    1602940 A1    12/2005
EP    1944212 A1    7/2008
(Continued)

OTHER PUBLICATIONS

Hanako Yamashiro et al., "Estimation of obstacle classification using laser radar".
(Continued)

*Primary Examiner* — Timothy A Brainard
(74) *Attorney, Agent, or Firm* — Carrier Blackman & Associates, P.C.; Joseph P. Carrier; Jeffrey T. Gedeon (57) ABSTRACT

A vehicle surroundings monitoring device includes a moving direction determining unit 20 which determines whether a physical body is moving in a traveling direction of a self vehicle or a transverse direction orthogonal to the traveling direction, from a change in a detection position of the physical body by a laser radar 8, wherein a classification determining unit 21 executes a first classification determining process of determining the physical body determined to be moving in the traveling direction as a four-wheel vehicle when dimensions of the physical body obtained from the detected position by the laser radar 8 is within a range of A1, and a second classification determining process of determining the physical body determined to be moving in the transverse direction as the four-wheel vehicle when the dimensions of the physical body obtained from the detected position by the laser radar 8 is within a range of B1.

7 Claims, 8 Drawing Sheets

(51) Int. Cl.
  *G01S 17/02*      (2006.01)
  *G08G 1/16*       (2006.01)
  *G01S 17/58*      (2006.01)
  *H04N 5/33*       (2006.01)
  *G06K 9/00*       (2006.01)
  *G08G 1/015*      (2006.01)

(52) U.S. Cl.
  CPC ............... *G08G 1/166* (2013.01); *G01S 17/58* (2013.01); *H04N 5/33* (2013.01); *G08G 1/167* (2013.01); *G08G 1/015* (2013.01); *G06K 9/00805* (2013.01)
  USPC .......................................................... 342/52

(56) References Cited

U.S. PATENT DOCUMENTS

2005/0270286 A1* 12/2005 Hirvonen et al. ............. 345/422
2006/0282218 A1   12/2006 Urai et al.
2007/0179712 A1    8/2007 Brandt et al.
2009/0254260 A1* 10/2009 Nix et al. ........................ 701/96

FOREIGN PATENT DOCUMENTS

| | | |
|---|---|---|
| EP | 2141926 A1 | 1/2010 |
| JP | 2003-226211 A | 8/2003 |
| JP | 2003-346286 A | 12/2003 |
| JP | 2005-121495 A | 5/2005 |
| JP | 2005-313780 A | 11/2005 |
| JP | 2007-132748 A | 5/2007 |
| JP | 2007-288460 A | 11/2007 |

OTHER PUBLICATIONS

Japanese Office Action dated Jun. 17, 2014 issued in the counterpart JP Patent Application JP 2012-505568.

* cited by examiner

VEHICLE SURROUNDINGS MONITORING DEVICE

BACKGROUND OF THE INVENTION

1. Field of the Invention

The present invention relates to a vehicle surroundings monitoring device which recognizes a physical body existing in the surroundings of a vehicle, using position information of the physical body by a radar mounted on the vehicle and a photographed image by a camera mounted on the vehicle.

2. Related Background Art

Conventionally, there is proposed a physical body detecting device in which a vehicle is mounted with a radar and a camera, and the physical body detecting device determines a type of the detected physical body on the basis of the distance to the physical body detected by the radar and the image of the physical body imaged by the camera (for example, refer to Patent Document 1).

The physical body detecting device disclosed in Patent Document 1 calculates a relative velocity between a self vehicle and the physical body from the change in the distance to the physical body detected by the radar, and calculates a moving velocity (an absolute velocity) of the physical body from the relative velocity and a traveling velocity of the self vehicle detected by a vehicle speed sensor.

And, from the moving velocity of the physical body, a directional vector distribution of an edge extracted from the photographed image by the camera, a distribution of a reflection intensity detected by the radar, and the reflection intensity, the device determines whether the physical body is either of another vehicle, a two-wheel car, a road structure, a pedestrian, or other physical body.

PRIOR ART REFERENCE

Patent Document

Patent Document 1: Japanese Patent Laid-open No. 2007-288460

SUMMARY OF THE INVENTION

Problems to Be Solved by the Invention

As is explained above, in the case where the type of the detected physical body is determined on the basis of the distance to the physical body detected by the radar and the image of the physical body imaged by the camera, there is an inconvenience that the reliability of the photographed image of the camera drops and the accuracy of the classification determination of the physical body drops, when receiving backlight in nighttime, in bad weather and the like.

Further, in the case where an infrared camera is used, there is an inconvenience that the reliability of the classification determination of the physical body drops, by the decrease in the contrast of the photographed image during severe heat.

Therefore, the present invention aims at providing a vehicle surroundings monitoring device which prevents the accuracy of the classification determination of the physical body from dropping, in the case where the reliability of the photographed image by the camera has dropped from the influence of the environment.

Means for Solving the Problems

The present invention has been made in order to achieve the above-mentioned aim, and relates to a vehicle surroundings monitoring device equipped with a radar which is mounted on a vehicle and which detects a relative position of the vehicle and a physical body existing within a first monitoring range in the surroundings of the vehicle, a camera which is mounted on the vehicle and which images a second monitoring range overlapping the first monitoring range, and a classification determining unit which determines a classification of the physical body existing in the surroundings of the vehicle on the basis of a detection data by the radar and a photographed image by the camera.

And, the vehicle surroundings monitoring device comprises: a moving direction determining unit which determines whether the physical body is moving in a traveling direction of the vehicle or is moving in a transverse direction orthogonal to the traveling direction, from a change in a detected position or a detected velocity of the physical body by the radar; wherein the classification determining unit executes a first classification determining process of determining that the physical body is a four-wheel vehicle, for the physical body determined by the moving direction determining unit to be moving in the traveling direction, when dimensions of the physical body obtained from the detected position by the radar is within a first predetermined range, and executes a second classification determining process of determining that the physical body is the four-wheel vehicle, for the physical body determined by the moving direction determining unit to be moving in the transverse direction, when the dimensions of the physical body obtained from the detected position by the radar is within a second predetermined range.

According to the present invention, the moving direction (traveling direction/transverse direction) of the physical body detected by the radar is determined by the moving direction determining unit. Thereafter, the classification determining unit determines whether or not the physical body is the four-wheel vehicle, for the physical body in which the moving direction is determined, separately for each moving direction, by performing the first classification determining process or the second classification determining process on the basis of the dimensions of the physical body obtained from the detected position by the radar. In this case, for the four-wheel vehicle, the determination is performed without using the photographed image of the camera, so that it becomes possible to prevent the determination accuracy that the physical body is the four-wheel vehicle from dropping, in the case where the reliability of the photographed image by the camera drops from the influence of the environment.

Further, the classification determining unit determines the classification of the physical body, for the physical body with the dimensions smaller than the first predetermined range, in the first classification determining process, while segmenting whether the physical body is a two-wheel vehicle, the two-wheel vehicle or a bicycle, the two-wheel vehicle or the bicycle or a pedestrian, or the two-wheel vehicle or the bicycle or the pedestrian or a structure, according to the dimensions of the physical body and the velocity thereof.

According to the present invention, by performing the segmenting according to the dimensions of the physical body and the velocity thereof for the physical body in which the dimensions are smaller than the first predetermined range, it becomes possible to perform the classification determination of the physical body with the photographed image, after narrowing down the classification of the physical body to a certain extent. Therefore, it becomes possible to perform the classification determination of the physical body with the photographed image efficiently, and to reduce erroneous determination of the classification.

Further, the classification determining unit determines the classification of the physical body, for the physical body with dimensions smaller than the second predetermined range, in the second classification determining process, while segmenting whether the physical body is a two-wheel vehicle, the two-wheel vehicle or a bicycle, the two-wheel vehicle or the bicycle or a structure, a pedestrian, or the pedestrian or the structure, according to the dimensions of the physical body and the velocity thereof.

According to the present invention, by performing the segmenting according to the dimensions of the physical body and the velocity thereof for the physical body in which the dimensions are smaller than the second predetermined range, it becomes possible to perform the classification determination of the physical body with the photographed image, after narrowing down the classification of the physical body to a certain extent. Therefore, it becomes possible to perform the classification determination of the physical body with the photographed image efficiently, and to reduce erroneous determination of the classification.

Further, the classification determining unit determines the classification of the physical body, for the physical body not determined as the four-wheel vehicle by the first classification determining process or the second classification determining process, from a level of reflection intensity or a distribution of the reflection intensity of the physical body detected by the radar.

According to the present invention, the level of the reflection intensity and the distribution of the reflection intensity of the physical body detected by the radar differs by the classification of the physical body (a two-wheel vehicle, the bicycle, the pedestrian and the like). Therefore, the classification determining unit may determine the classification of the physical body, by the level of the reflection intensity or the distribution of the reflection intensity of the physical body detected by the radar. And, also in this case, the determination of classification is performed without using the photographed image by the camera, so that it becomes possible to prevent the classification determination accuracy of the physical body from dropping, in the case where the reliability of the photographed image by the camera drops from the influence of the environment.

Further, the classification determining unit detects a position or a number of reflector mounted on the physical body not determined as the four-wheel vehicle by the second classification determining process from the level of the reflection intensity of the physical body detected by the radar, and determines whether the physical body is the two-wheel vehicle or the bicycle on the basis of the position or the number of the reflector on the physical body.

According to the present invention, when the self vehicle is following the two-wheel vehicle, one reflector attached to a rear fender or the like of the two-wheel vehicle is detected, and when the self vehicle is following the bicycle, the reflectors attached to both pedals are detected in addition to the reflector mounted to the rear fender or the like of the bicycle. As such, because the mounted position and mounted number of the reflector differs in the two-wheel vehicle and the bicycle, the classification determining unit may determine whether the physical body is the two-wheel vehicle or the bicycle, on the basis of the detected position or the detected number of the reflector in the physical body. And, in this case, the classification determination of the two-wheel vehicle and the bicycle is performed without using the photographed image by the camera, so that it becomes possible to prevent the classification determination accuracy of the physical body from dropping, in the case where the reliability of the photographed image by the camera drops from the influence of the environment.

Further, the classification determining unit detects the position of the reflector mounted on the physical body not determined as the four-wheel vehicle by the second classification determining process from the level of the reflection intensity of the physical body detected by the radar, and determines that the physical body is the bicycle when the position of the reflector on the physical body changes periodically.

According to the present invention, in the case where the detected position of the reflector in the physical body periodically changes, it may be assumed that the reflectors of the pedals displacing vertically by the pedaling operation of the pedals by the rider of the bicycle are detected. Therefore, in this case, the classification determining unit may determine that the physical body detected by the radar is the bicycle. And, in this case, the determination of whether or not the physical body is the bicycle is performed without using the photographed image by the camera, so that it becomes possible to prevent the classification determination accuracy of the physical body from dropping, in the case where the reliability of the photographed image by the camera drops from the influence of the environment.

DETAILED DESCRIPTION OF THE PREFERRED EMBODIMENTS

Figure 1:
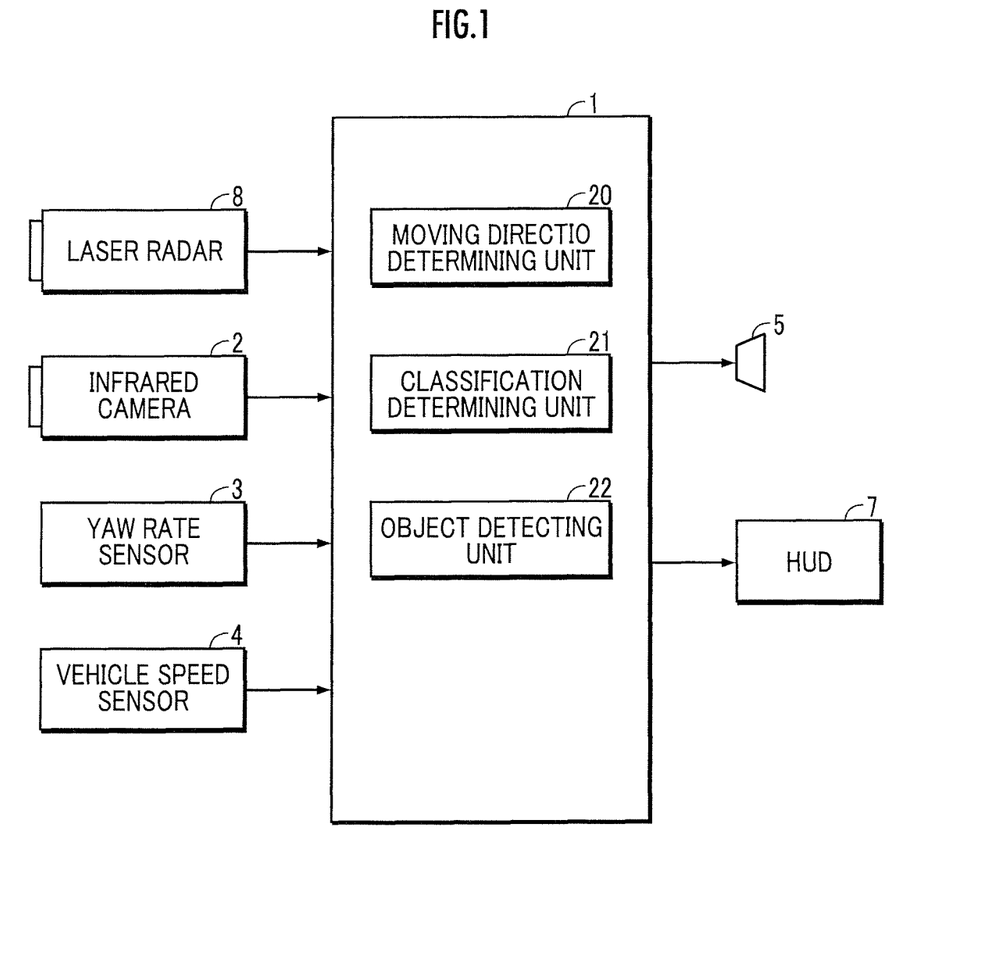
FIG. 1 is a configuration diagram of a vehicle surroundings monitoring device of the present invention.

An embodiment of the present invention will be explained with reference to FIG. 1 through FIG. 8. Referring to FIG. 1, the vehicle surroundings monitoring device of the present invention is equipped with an ECU (Electronic Control Unit) 1, an infrared camera (corresponds to the camera of the present invention) capable of detecting far infrared ray, a laser radar 8 (corresponds to the radar of the present invention) which detects a relative position (includes relative distance) between a physical body and a vehicle in real space by irradiating laser light to the physical body and receiving a reflected wave therefrom, a yaw rate sensor 3 which detects a yaw rate of the vehicle, and a vehicle speed sensor 4 which detects a traveling speed of the vehicle.

The ECU 1 discriminates a classification of the physical body (four-wheel vehicle, two-wheel vehicle, bicycle, pedestrian, and the like) existing in front of the vehicle from a detection data of the position of the physical body by the laser radar 8 and a photographed image by the infrared camera 2, and outputs a warning upon detecting the bicycle or the pedestrian having high possibility of being contacted by the vehicle.

Further, the vehicle surroundings monitoring device is equipped with a loudspeaker 5 for performing warning by voice, and a head-up display (hereinafter referred to as HUD) 7 for performing indication for making a driver visually recognize a monitoring object.

Figure 2:
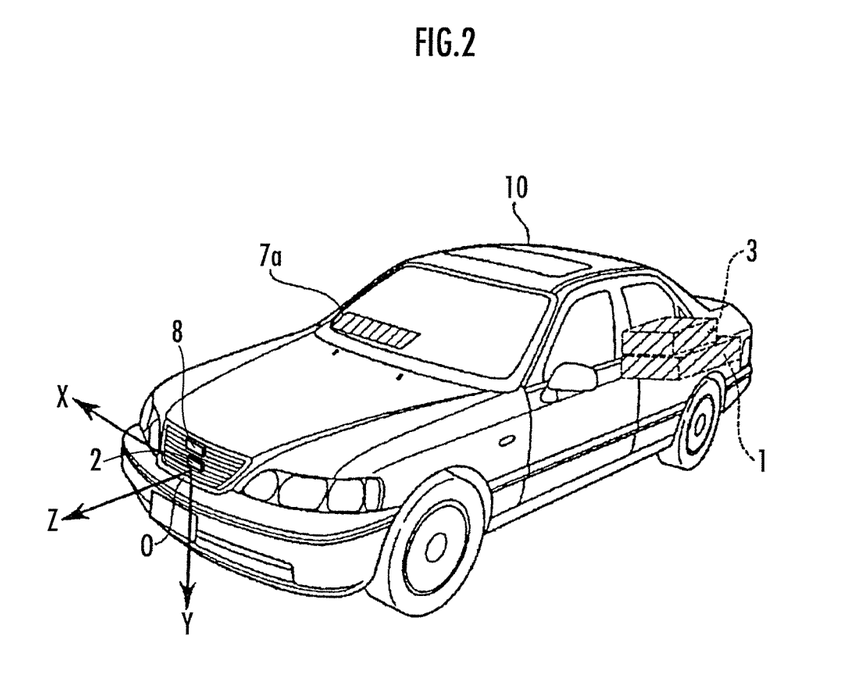
FIG. 2 is an explanatory view of a mounting manner of the vehicle surroundings monitoring device to a vehicle.

Next, with reference to FIG. 2, a mounting manner of the vehicle surroundings monitoring device to the vehicle will be explained. The laser radar 8 is a laser radar of a scan type, and is arranged at a front portion of a vehicle 10. The laser radar 8 scans within a first monitoring range set preliminarily at front (a traveling direction of the vehicle 10), in a horizontal direction and a vertical direction.

The infrared camera 2 has a characteristics that the output level thereof becomes larger (luminance becomes higher) as the temperature of the imaged object becomes higher. And, the infrared camera 2 is arranged at the front portion of the vehicle 10 and images a second monitoring range set preliminarily at front (set within the first monitoring range). The HUD 7 is provided so that a screen 7a is displayed at a windshield at a front position on the driver's side.

The ECU 1 includes an image input circuit which converts an analog video signal output from the infrared camera 2 into digital data and imports the same in an image memory, an interface circuit for accessing (reading and writing) the image data imported to the image memory, and an interface circuit for inputting a detection signal of the position of the physical body by the laser radar 8 (a relative position of the physical body from the vehicle 10).

Further, the ECU 1 is an electronic unit equipped with a computer (an arithmetic processing circuit comprising a CPU, a memory, an input/output circuit and the like, or a micro computer aggregating these functions) which performs various arithmetic processing to the image data of the front of the vehicle imported to the image memory.

By making the computer execute a program for vehicle surroundings monitoring, the computer functions as a moving direction determining unit 20 which determines a moving direction (the traveling direction/a transverse direction of the vehicle 10) of the physical body from the detected data by the laser radar 8, a classification determining unit 21 which determines a classification of the physical body existing at the surroundings of the vehicle 10 from the detected data by the laser radar 8 and the photographed image by the infrared camera 2, and an object detecting unit 22 which detects the physical body (an object) which has high possibility of contacting the vehicle 10 from the detected data by the laser radar 8 and the photographed image by the infrared camera 2.

The moving direction determining unit 20 determines that the moving direction of the physical body is the traveling direction of the vehicle 10, when the position of the physical body detected by the laser radar 8 is changing in the traveling direction (front-back direction) of the vehicle. Further, the moving direction determining unit 20 determines that the moving direction of the physical body is the transverse direction with respect to the vehicle 10, when the position of the physical body detected by the laser radar 8 is changing in the transverse direction (horizontal direction) of the vehicle.

The moving direction of the physical body may be determined from an orientation of a velocity, by detecting the velocity of the physical body (a relative velocity with the vehicle 10) from the change of the position of the physical body detected by the laser radar 8.

An object detecting unit 22 reads the output of the vehicle speed sensor 4 and the yaw rate sensor 3, and calculates the angle of turn of the vehicle 10. Thereafter, on the basis of a ranging data by the laser radar 8, a tracking of the physical body existing within the first monitoring region is performed while performing the angle of turn correction. Further, the object detecting unit 22 performs annunciation by information indication to the HUD 7 and voice output from the loudspeaker 5, when it is determined from the photographed image of the infrared camera 2 that the physical body to which tracking is performed is a pedestrian or a bicycle having high contact possibility with the vehicle 10.

The classification determining unit 21 calculates the relative velocity of the physical body with respect to the vehicle 10 from the change in the position of the physical body detected by the laser radar 8, and calculates an absolute velocity of the physical body from the relative velocity and the traveling velocity of the vehicle 10 detected by the vehicle speed sensor 4. Further, the classification determining unit 21 determines the classification of the physical body by recognizing a dimensions of the physical body from the position detection data by the laser radar 8, and by performing a first classification determining process or a second classification determining process explained below.

[First Classification Determining Process]

The classification determining unit 21 executes the first classification determining process, when it is determined by the moving direction determining unit 20 that the moving direction is the traveling direction of the vehicle 10. In the first classification determining process, as is shown in FIG. 3, the classification determining unit 21 determines the classification of the physical body, by the velocity (the absolute velocity) of the physical body and a width (a width of the physical body in the transverse direction with respect to the vehicle 10; corresponds to dimensions of the physical body of the present invention) of the physical body.

Figure 3:
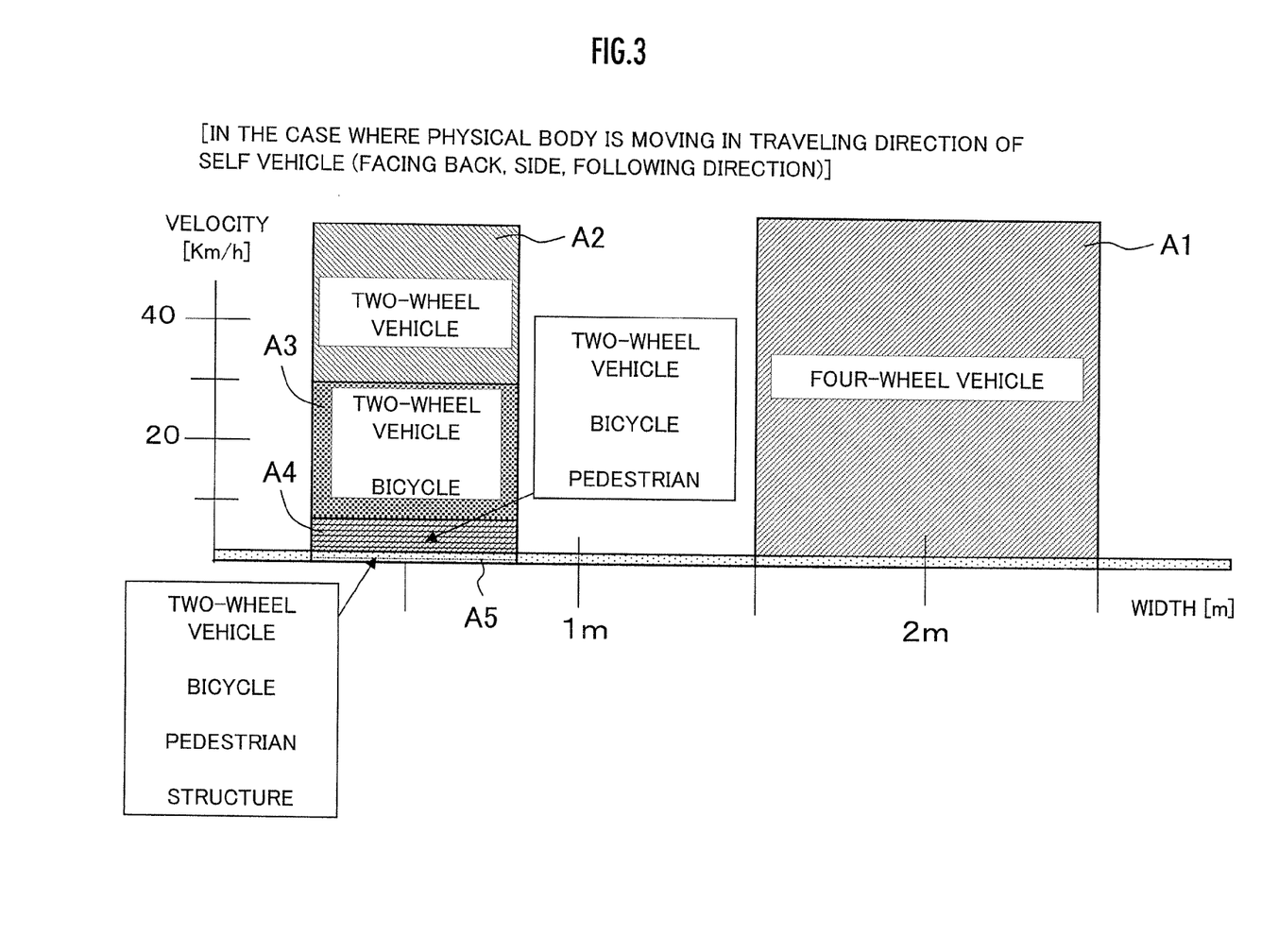
FIG. 3 is an explanatory view of a classification determination of a physical body existing in a traveling direction.

FIG. 3 shows the range of the corresponding classification, by setting the moving velocity (the absolute velocity) of the physical body to the axis of ordinate, and the width (the width in the transverse direction of the vehicle 10) of the physical body to the axis of abscissas. First, A1, which is a range where the width is from 1.5 m to 2.5 m (corresponds to the first predetermined range of the present invention) is allotted to the four-wheel vehicle.

As the velocity of the physical body, by using not the velocity of a specific moment, but a maximum velocity within the velocity of the physical body tracked for a predetermined time, it becomes easier to segment by velocity.

Further, for the range in which the width is from 0.25 m to 0.8 m, a range A2 in which the velocity exceeds 30 km/h is allotted to the two-wheel vehicle, a range A3 in which the velocity is from 8 km/h to 30 km/h is allotted to the two-wheel vehicle and the bicycle, and a range A4 in which the velocity is less than 8 km/h is allotted to the two-wheel vehicle, the bicycle, and the pedestrian. Moreover, a range A5 at the velocity in the vicinity of 0 km/h is allotted to the two-wheel vehicle, the bicycle, the pedestrian, and a structure.

The classification determining unit 21 determines, from FIG. 3, that the physical body belonging to A1 is the four-wheel vehicle, and determines the physical body belonging to A2 is the two-wheel vehicle. Further, for the physical body belonging to A4, the classification determining unit 21 determines whether it is the pedestrian or not from the difference in a reflection intensity of the laser radar 8 shown in FIG. 4.

Figure 4:
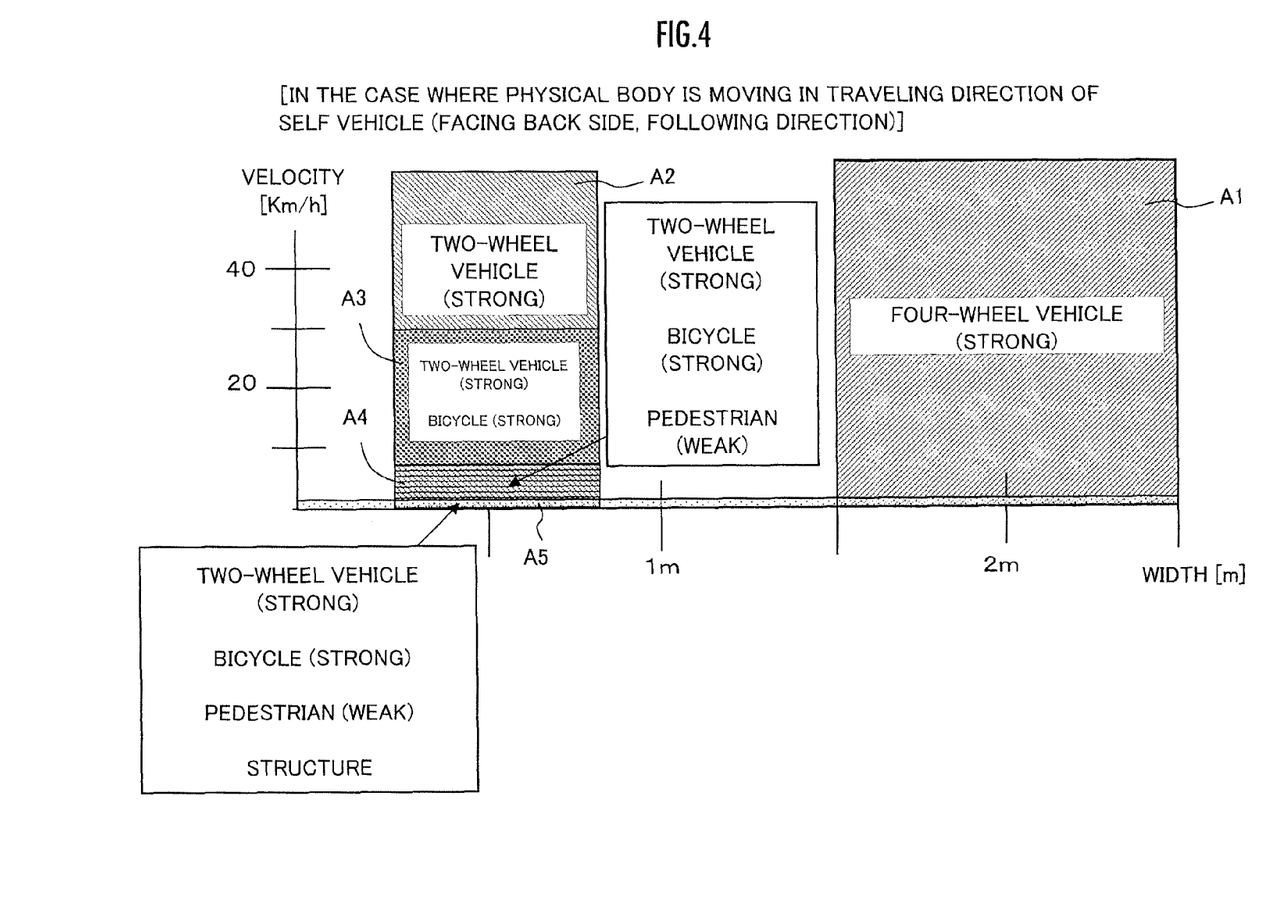
FIG. 4 is an explanatory view of the classification determination of the physical body taking into consideration a reflection intensity of a laser radar.

FIG. 4 adds a classification segment by dynamics of the reflection intensity of the physical body to FIG. 3, and determines that the physical body is the pedestrian when the reflection intensity belonging to A4 is weak (level of the reflection intensity is less than a predetermined threshold value).

Figure 5:
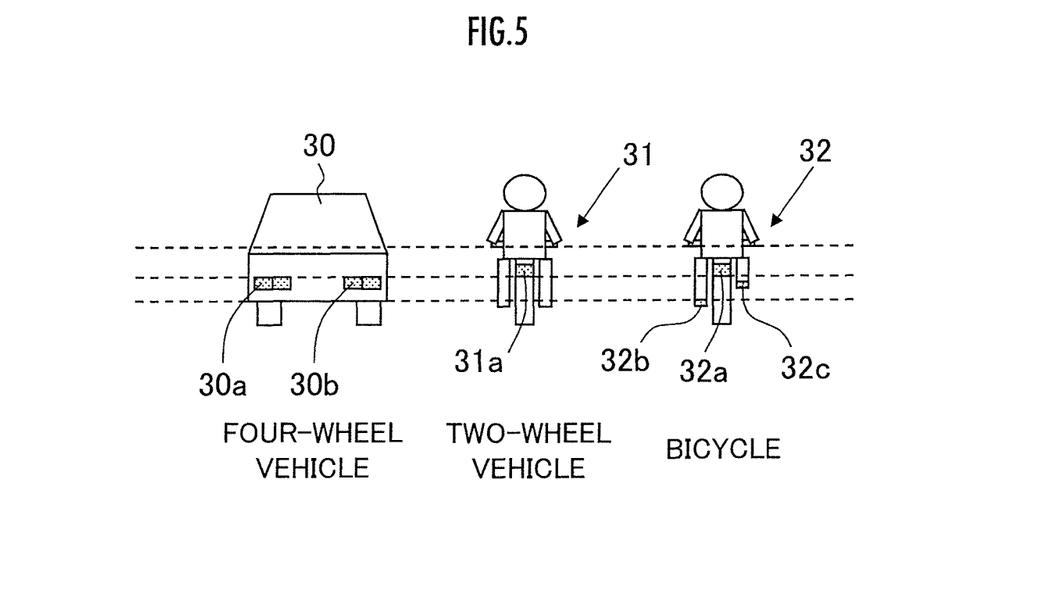
FIG. 5 is an explanatory view of the determination of a bicycle and a two-wheel vehicle by a position of a reflector.

Further, the classification determining unit 21 detects a reflector from a distribution of the reflection intensity of the physical body, as is shown in FIG. 5, and discriminates the two-wheel vehicle and the bicycle belonging to A3 or A4. In the two-wheel vehicle 31 in FIG. 5, one reflector 31a having strong reflection intensity is detected, and on the other hand, in the bicycle 32, the reflectors having strong reflection intensity, other than 32a at the rear fender, 32b, 32c at the both pedals are detected.

Therefore, the classification determining unit 21 may determine while segmenting the two-wheel vehicle and the bicycle, from the difference in the position or the difference in the number of reflectors detected. The classification determining unit 21 may determine the four-wheel vehicle 30 while segmenting from the two-wheel vehicle and the bicycle, from the difference in the position (height from the ground surface) or the difference in the number of the reflectors 30a, 30b.

Figure 6:
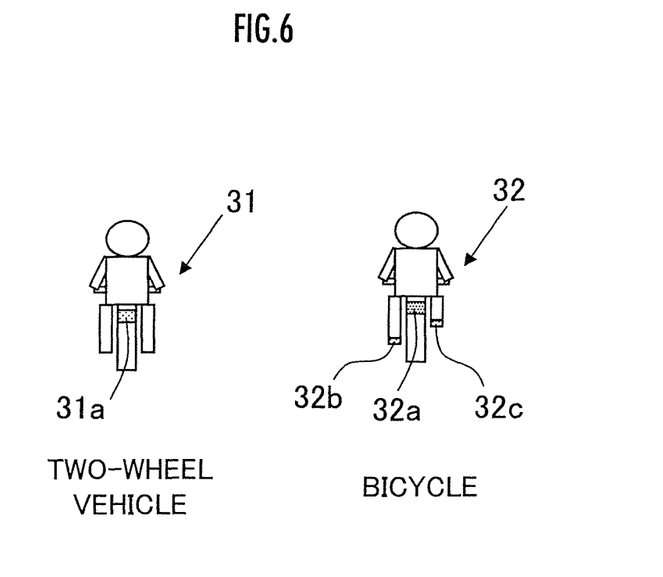
FIG. 6 is an explanatory view of the determination of the bicycle and the two-wheel vehicle by a displacement of the reflector.

Further, as is shown in FIG. 6, when the detected physical body is the bicycle 32, the reflectors mounted on the pedals vertically displace periodically, in accordance with pedaling of the rider of the bicycle. Therefore, the position of the reflectors detected from the reflection intensity by the laser radar 8 changes periodically. In contrast thereto, in the case of the two-wheel vehicle 31, the position of the reflector 31a hardly changes.

Therefore, for the physical body belonging to A3 or A4, the classification determining unit 21 determines the physical body to be the two-wheel vehicle, when the reflector (the position in which the reflection intensity is equal to or more than the predetermined level) with the position thereof changing periodically is detected.

For the physical body belonging to A4, the classification determining unit 21 determines whether or not the physical body is the pedestrian from the characteristics of the image portion in the photographed image by the infrared camera 2. Further, for the physical body belonging to A5, the classification determining unit 21 performs a process of excluding the predicted structures such as utility poles and roadside trees and those having the characteristics of the two-wheel vehicle (having the image portions of heat sources such as a muffler, and the like), from the photographed image by the infrared camera 2, and then discriminates the bicycle and the pedestrian by the difference in the reflection intensity, the existence or nonexistence of the reflector, and the like, as is explained above.

[Second Classification Determining Process]

Figure 7:
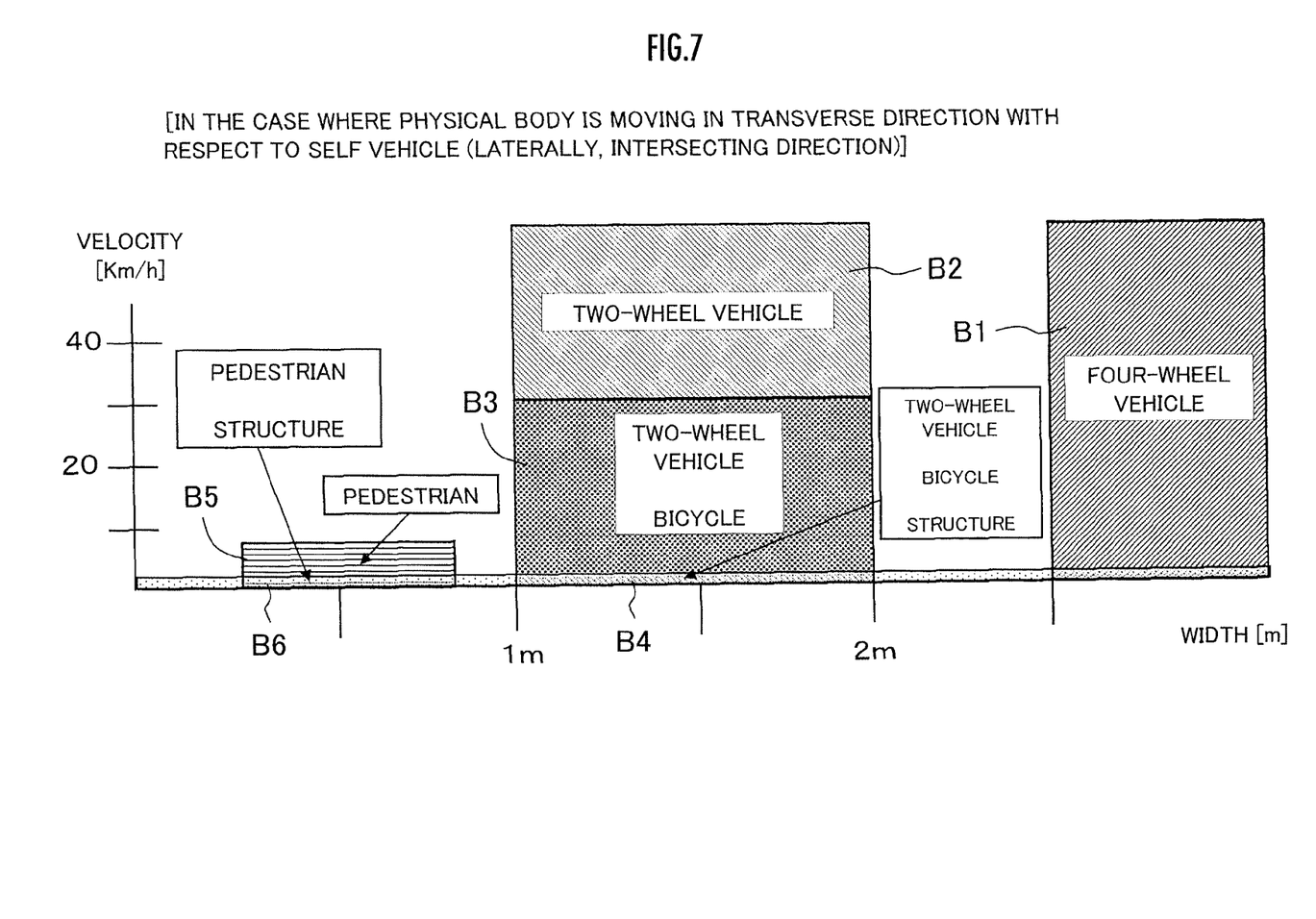
FIG. 7 is an explanatory view of the classification determination of the physical body existing in a transverse direction.

Subsequently, in the case where it is determined by the moving direction determining unit 20 that the moving direction is the transverse direction with respect to the vehicle 10, the classification determining unit 21 executes the second classification determining process. In the second classification determining process, as is shown in FIG. 7, the classification determining unit 21 determines the classification of the physical body by the velocity (absolute velocity) of the physical body and the width (the width in the direction orthogonal to the traveling direction of the vehicle) of the physical body.

FIG. 3 shows the range of the corresponding classification, by setting the moving velocity (the absolute velocity) of the physical body to the axis of ordinate, and the width (the width in the transverse direction of the vehicle 10, corresponds to the dimensions of the physical body of the present invention) of the physical body to the axis of abscissas. First, B1, which is a range where the width exceeds 2.5 m (corresponds to the second predetermined range of the present invention) is allotted to the four-wheel vehicle.

Further, for the range in which the width is from 1 m to 2 m, a range B2 in which the velocity exceeds 30 km/h is allotted to the two-wheel vehicle, a range B3 in which the velocity is from 1 km/h to 30 km/h is allotted to the two-wheel vehicle and the bicycle, and a range B4 in which the velocity is approximately 0 km/h is allotted to the two-wheel vehicle, the bicycle, and the structure.

Further, for the range in which the width is from 0.25 m to 0.8 m, a range B5 in which the velocity is from 1 km/h to 8 km/h is allotted to the pedestrian, and a range B6 in which the velocity is approximately 0 km/h is allotted to the pedestrian, and the structure.

From FIG. 7, the classification determining unit 21 determines the physical body in the range B1 as the four-wheel vehicle, and determines the physical body in the range B2 as the two-wheel vehicle. Further, for the physical body belonging to B3, the classification determining unit 21 discriminates whether it is the two-wheel vehicle or the bicycle, from the difference in the distribution of the reflection intensity by the laser radar 8 shown in FIG. 8.

Figure 8:
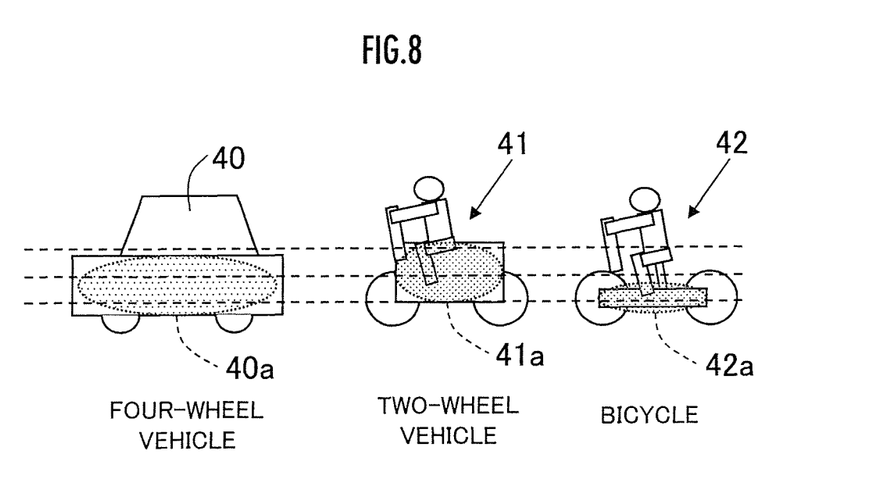
FIG. 8 is an explanatory view of the classification determination of the physical body by a reflection intensity distribution.

As is shown in FIG. 8, when comparing the two-wheel vehicle 41 and the bicycle 42, the ranges 41a, 42a in which the level of the reflection intensity by the laser radar 8 becomes high (metal portion and the like) becomes larger for the range 41a in the two-wheel vehicle 41 than the range 42a in the bicycle 42, and the position thereof from the ground surface becomes higher. Therefore, the classification determining unit 21 may discriminate whether the physical body is the two-wheel vehicle or the bicycle, from the ratio of the portion having high reflection intensity occupying the overall product, or the difference in the height of the portion having high reflection intensity from the ground surface.

Further, the classification determining unit 21 determines the physical body belonging to B5 as the pedestrian. Further, the classification determining unit 21 discriminates whether the physical body belonging to B4 is the two-wheel vehicle or the bicycle, after excluding the predicted structures such as the utility poles and the roadside trees, from the characteristics in the photographed image by the infrared camera 2.

Further, the classification determining unit 21 determines whether the physical body belonging to B6 is a pedestrian, after excluding the predicted structures such as the utility poles and the roadside trees, from the characteristics in the photographed image by the infrared camera 2.

In the present embodiment, the width of the physical body is used as the dimensions of the physical body. However, other elements such as a boundary length, a square measure, a length of a diagonal line and the like of the physical body may also be used.

Further, in the present embodiment, the infrared camera 2 is used as an imaging means of the present invention. However, a normal video camera capable of detecting visible light only may be used.

INDUSTRIAL APPLICABILITY

As is explained above, according to the vehicle surrounding monitoring device of the present invention, it becomes possible to prevent the accuracy of the classification determination of the physical body from dropping in the case where the reliability of the photographed image by the camera has dropped from the influence of the environment. Therefore it is useful for determining the classification and monitoring the physical body in the surroundings of the vehicle.

Explanation Of References

1 . . . ECU, 2 . . . infrared camera, 3 . . . yaw rate sensor, 4 . . . vehicle speed sensor, 6 . . . loudspeaker, 7 . . . HUD, 8 . . . laser radar, 10 . . . vehicle (self vehicle), 20 . . . moving direction determining unit, 21 . . . classification determining unit, 22 . . . object detecting unit.

What is claimed is:

1. A vehicle surroundings monitoring device equipped with a radar which is mounted on a vehicle and which detects a relative position of the vehicle and a physical body existing within a first monitoring range in the surroundings of the vehicle, a camera which is mounted on the vehicle and which images a second monitoring range overlapping the first monitoring range, and a classification determining unit which determines a classification of the physical body existing in the surroundings of the vehicle based on detection data from the radar and a photographed image from the camera, wherein the classification determining unit is configured to execute a process of excluding the physical body whose classification was determined based on the photographed image and then to execute classification determination based on the detection data from the radar with respect to the physical body whose classification has not been determined.

2. The vehicle surroundings monitoring device according to claim 1 further comprising:

a moving direction determining unit which determines whether the physical body is moving in a traveling direction of the vehicle or is moving in a transverse direction orthogonal to the traveling direction, from a change in a detected position or a detected velocity of the physical body by the radar, wherein the classification determining unit is configured to determine whether the physical body is a bicycle or a pedestrian by the radar, in a case where the physical body determined by the moving direction determining unit is determined to be moving in the traveling direction of the vehicle.

3. The vehicle surroundings monitoring device according to claim 2 further comprising:

wherein the classification determining unit is configured to determine whether the physical body is a two-wheel vehicle or a bicycle by the radar, in a case where the physical body determined by the moving direction determining unit is determined to be moving in the transverse direction of the vehicle.

4. The vehicle surroundings monitoring device according to claim 2, wherein the execution of the classification determination by the classification determining unit is based exclusively on the detection data from the radar with respect to the physical body whose classification has not been determined.

5. The vehicle surroundings monitoring device according to claim 2, wherein the execution of the classification determination by the classification determining unit is based on the detection data from the radar with respect to the physical body whose classification has not been determined in a case where reliability of the photographed image is decreased due to influence of the environment.

6. The vehicle surroundings monitoring device according to claim 5, wherein the execution of the classification determination by the classification determining unit is based exclusively on the detection data from the radar with respect to the physical body whose classification has not been determined.

7. The vehicle surroundings monitoring device according to claim 1 further comprising:

a moving direction determining unit which determines whether the physical body is moving in a traveling direction of the vehicle or is moving in a transverse direction orthogonal to the traveling direction, from a change in a detected position or a detected velocity of the physical body by the radar, wherein the classification determining unit is configured to determine whether the physical body is a two-wheel vehicle or a bicycle by the radar, in a case where the physical body determined by the moving direction determining unit is determined to be moving in the transverse direction of the vehicle.

* * * * *